March 29, 1966  L. F. JEZEK, JR  3,243,537
SAFETY CIRCUIT BREAKER FOR MOTOR VEHICLES
Filed March 26, 1965
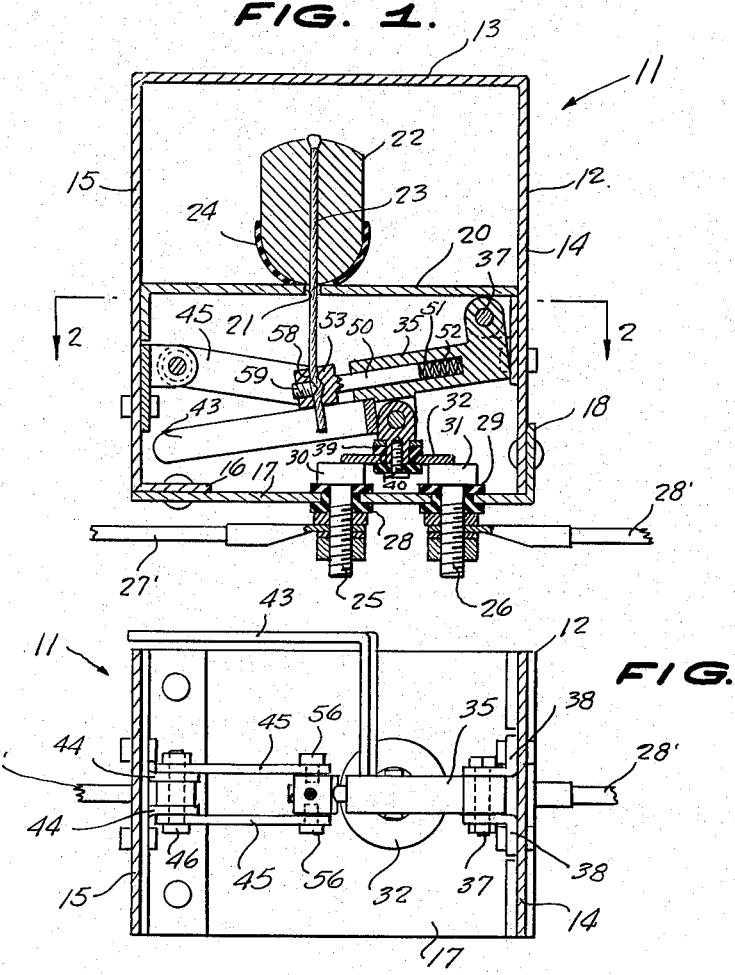
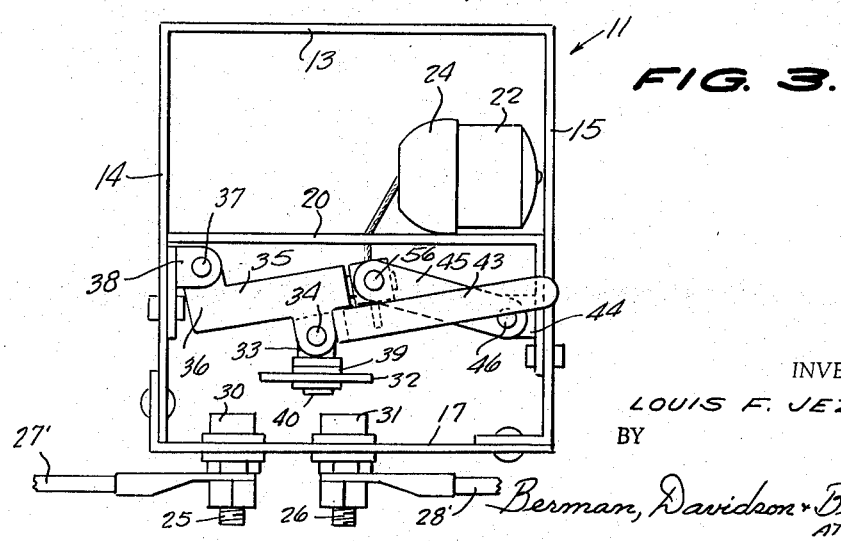
INVENTOR.
LOUIS F. JEZEK, JR.
BY
Berman, Davidson & Berman
ATTORNEYS.

United States Patent Office 3,243,537
Patented Mar. 29, 1966

3,243,537
SAFETY CIRCUIT BREAKER FOR
MOTOR VEHICLES
Louis F. Jezek, Jr., Rte. 3, P.O. Box 204, Temple, Tex.
Filed Mar. 26, 1965, Ser. No. 442,936
6 Claims. (Cl. 200—61.45)

This invention relates to safety switch devices, and more particularly to an improved impact-responsive safety switch assembly particularly useful for automatically disconnecting the electrical system of a motor vehicle from its battery responsive to an impact or excessive shock experienced by the motor vehicle.

A main object of the invention is to provide a novel and improved safety switch of the inertia type, said switch being relatively simple in construction, being easy to install, and being easy to reset.

A further object of the invention is to provide an improved impact-responsive switch adapted to be employed in the battery circuit of a motor vehicle to disconnect the battery automatically from the vehicle electrical circuit responsive to an impact or shock received by the motor vehicle, the switch being relatively inexpensive to fabricate, being durable in construction, being reliable in operation, and employing a minimum amount of moving parts.

A still further object of the invention is to provide an improved safety switch for a motor vehicle which may be used either as an impact-responsive switch to automatically disconnect the electrical circuit of the automobile from the vehicle battery responsive to a shock or impact received by the vehicle, or as a means to render the electrical circuit inoperative, when desired, for example, to prevent theft of the vehicle.

A still further object of the invention is to provide an improved safety switch for a motor vehicle, the switch being compact in size, being quick-acting, and being designed so that it can be installed on any type of vehicle.

Further objects and advantages of the invention will become apparent from the following description and claims, and from the accompanying drawings, wherein:

FIGURE 1 is a longitudinal vertical cross-sectional view taken to show an improved safety switch assembly constructed in accordance with the present invention, shown connected in the battery circuit of a motor vehicle.

FIGURE 2 is a horizontal cross-sectional view taken substantially on the line 2—2 of FIGURE 1.

FIGURE 3 is a side elevational view of the switch of FIGURES 1 and 2, shown in circuit-opening position, the view being taken from the opposite side of the switch, as compared with FIGURE 1.

Referring to the drawings, 11 generally designates an improved circuit breaker or safety switch for motor vehicles, constructed in accordance with the present invention. The switch assembly comprises a main housing 12 which is of generally inverted U shape and which comprises a plate-like top wall 13 and depending side walls 14 and 15, the side wall 15 being provided with a horizontal bottom flange 16. Secured to the bottom flange 16 is a horizontal bottom plate 17 which extends parallel to the top wall 13, said bottom plate 17 being provided adjacent the wall 12 with an upstanding flange 18 which is connected to the lower end portion of said wall 12. Rigidly secured in the generally rectangular box-like housing thus defined, is a plate-like intermediate wall 20 which is spaced substantially midway between the top wall 13 and the bottom plate member 17, and which is substantially parallel thereto. The horizontal intermediate plate number 20 is formed with an aperture 21 at its intermediate portion. Designated at 22 is a relatively massive body of heavy material, such as relatively heavy metal, in which is embedded a flexible cable 23, the cable extending axially through the generally cylindrical heavy body 22 and extending slidably through the aperture 21. The lower portion of the body 22 is provided with a sound-absorbing annular rubber cover 24 which normally rests on the horizontal plate 20 and prevents rattling of the body 22 thereagainst.

Designated at 25 and 26 are a pair of terminals which are secured in the bottom plate 17, being insulated therefrom by respective insulating bushings 28 and 29 of rubber or other suitable deformable insulating material, the bushings 28 and 29 being of grommet form so that they are lockingly engaged in apertures provided therefor in the plate member 17, as illustrated. A first cable 27' is connected to the terminal 25, the cable 27' leading to the ungrounded terminal of the battery of the associated vehicle. A second cable 28' is connected to the terminal 26, the second cable 28' leading to the electrical circuit of the associated vehicle.

The terminal bolts 25 and 26 have head portions 30 and 31 which are normally bridged by a conductive disc 32 carried by a pivoted arm 33, the arm 33 being pivotally connected at 34 to a lever arm 35. The lever arm 35 has a right-angled end portion 36 which is pivoted at 37 to brackets 38 secured to the vertical side wall element 14.

As shown in FIGURE 1, the disc 32 is insulated from the arm 33 by means of a grommet 39 of rubber or other suitable insulating material, the grommet 39 being mounted in a central aperture provided in the disc 32, and the disc being fastened to the arm 33 by a bolt 40 extending through grommet 39.

As shown in FIGURE 1, the terminal heads 30 and 31 are spaced sufficiently to receive the lower portion of grommet 39 and the head of bolt 40 therebetween when the disc 32 is in conductive engagement with the top surfaces of the terminal heads.

Lever arm 35 is integrally formed with a right-angled operating handle 43 whose outer arm portion extends outside the housing 12 and extends parallel to the plane of the front edges of the housing wall elements 12, 13 and 15.

As shown on FIGURE 2, the outer arm of the handle 43 also extends parallel to the main body portion of the lever arm 35.

As shown in FIGURE 2, the right-angled end portion 36 of the lever arm 35 is pivoted in the bracket structure defined between the angle brackets 38, 38 secured to side wall 14. Similar angle brackets 44, 44 are secured to the side wall 15 opposite the angle brackets 38, 38, and pivoted to said angle brackets 44, 44 are respective link bars 45, 45, the link bars being pivotally connected to the angle brackets 44, 44 by a transverse pivot bolt 46. Designated at 50 is a plunger member which is slidably received in an axial bore 51 provided in the lever arm 35, the inner end of the plunger member 50 bearing against one end of a coil spring 52 disposed in bore 51. The plunger member 50 is provided with the enlarged substantially rectangular head portion 53 which is received between and pivotally connected to the ends of the link bars 45, 45 as by respective pivot bolts 56, 56 which extend through apertures provided in the ends of the link bars 45, 45 and which are threadedly engaged in the opposite side portions of the head member 53. The flexible cable member 23 extends through a central bore 58 provided in the head member 53 and is anchored therein by a set screw 59.

As will be readily apparent, the elements 45, 53, 50 and 35, in cooperation with the coil spring 52, define a toggle linkage. In the lowered position of the linkage, the cable 23 is held in tension, urging the weight member 22 against the apertured intermediate horizontal plate member 20. Under these conditions, the toggle linkage always also exerts downward force on the disc member 32, holding the disc member in conductive bridging engagement with the terminal heads 30 and 31. If, under these conditions, the vehicle on which the assembly is mounted is suddenly decelerated, experiences an impact, or is otherwise excessively vibrated, the inertia of the massive body 22 causes it to exert tension on the cable member 23 which may be sufficient to overcome the biasing force of the toggle spring 52, lifting the head portion 53 sufficiently to overpass the dead-center position of the toggle linkage, whereupon the arm 35 and link bars 45, 45 are snapped upwardly to a position such as that illustrated in FIGURE 3, raising the disc member 32 away from the terminal heads 30 and 31. Therefore, when the vehicle experiences an impact or is otherwise excessively jarred, the inertia of the massive body 22 acts on the toggle linkage to cause the switch to automatically open in the manner above described thereby disconnecting the electrical circuits of the vehicle from its battery. This considerably reduces risks of fire or other damage which may be caused by short circuits in any part of the vehicle electrical system.

The switch may be easily reset by operating the handle 43, namely, by moving the handle downwardly to the position thereof shown in FIGURE 1, which lowers the toggle linkage to the position shown therein, namely, to the position wherein the conductive disc member 32 bridges the terminal heads 30 and 31.

As is readily apparent, the switch assembly 11 may be used to disconnect the vehicle battery from the vehicle electrical circuits so as to prevent theft of the vehicle when it is parked. Thus, it is merely necessary to raise the lever 43 sufficiently to move the enlarged head member 53 upwardly past the dead-center position of the toggle linkage, thus causing the disc 32 to be held in its elevated position, shown in FIGURE 3. Since the outer lever portion of the handle 43 is relatively long, the switch can be opened by exerting relatively light upward pressure on the end of the handle. The switch can be closed by following a reverse procedure which resets the disc 32 to the position thereof shown in FIGURE 1.

As will be readily apparent, the safety switch device above described will operate not only to disconnect the vehicle battery from the vehicle electrical circuits when the associated vehicle encounters an obstruction while moving, but also when the vehicle is struck by another vehicle or by another object when stationary. In either case, sufficient vibration occurs to cause the weight member 22 to exert a jerk or pull on the cable element 23 sufficient to trip the switch.

While a specific embodiment of an improved impact-responsive safety switch device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an impact-responsive safety switch, a support, a pair of spaced contacts on said support, snap-acting toggle means mounted on said support and having a portion movable toward and away from said contacts between two extreme positions responsive to toggle action thereof, a conductive bridging member carried by said toggle means adjacent said portion in a position to conductively engage said spaced contacts when said portion is in one extreme position nearest said contacts, an apertured plate element rigidly secured on said support, a weight member, and flexible cable means extending through the aperture of said plate element and connecting said weight member to said portion and arranged so as to be placed in tension when said portion is in said one extreme position, said weight member being of sufficient mass to pull said portion past the dead-center position of said toggle means responsive to an impact on said support, whereby to disengage said bridging member from said contacts.

2. In an impact-responsive safety switch, a support, a pair of spaced contacts on said support, snap-acting toggle means mounted on said support and having a portion movable toward and away from said contacts between two extreme positions spaced on opposite sides of a dead-center position responsive to toggle action thereof, a conductive bridging member carried by said toggle means adjacent said portion in a position to conductively engage said spaced contacts when said portion is in one extreme position nearest said contacts, an apertured plate element rigidly secured on said support, a weight member, flexible cable means extending through the aperture of said plate element and connecting said weight member to said portion and arranged so as to be placed in tension when said portion is in said one extreme position, said weight member being of sufficient mass to pull said portion past said dead-center position responsive to an impact on said support, whereby to disengage said bridging member from said contacts, said toggle means comprising first link means pivoted to one side of said support, second link means pivoted to the opposite side of said support, means rotatably and slidably interconnecting said first and second link means, and spring means biasing the inner end of one of the link means away from the inner end of the other link means, said portion being at the inner end of one of the link means.

3. In an impact-responsive safety switch, a support, a pair of spaced contacts on said support, snap-acting toggle means mounted on said support and having a portion movable toward and away from said contacts between two extreme positions spaced on opposite sides of a dead-center position responsive to toggle action thereof, a conductive bridging member carried by said toggle means adjacent said portion in a position to conductively engage said spaced contacts when said portion is in one extreme position nearest said contacts, an apertured plate element rigidly secured on said support, a weight member, flexible cable means extending through the aperture of said plate element and connecting said weight member to said portion and arranged so as to be placed in tension when said portion is in said one extreme position, said weight member being of sufficient mass to pull said portion past said dead-center position responsive to an impact on said support, whereby to disengage said bridging member from said contacts, said toggle means comprising first link means pivoted to one side of said support, second link means pivoted to the opposite side of said support, means rotatably and slidably interconnecting said first and second link means, spring means biasing the inner end of one of the link means away from the inner end of the other link means, said portion being at the inner end of one of the link means, and a reset lever rigidly connected to one of the link means and projecting externally from the support.

4. In an impact-responsive safety switch, a support, a pair of spaced contacts on said support, snap-acting toggle means mounted on said support and having a portion movable toward and away from said contacts between two extreme positions spaced on opposite sides of a dead-center position responsive to toggle action thereof, a conductive bridging member carried by said toggle means adjacent said portion in a position to conductively engage said spaced contacts when said portion is in one extreme position nearest said contacts, an apertured plate element rigidly secured on said support, a weight member, and flexible cable means extending through the aperture of said plate element and connecting said weight member to said portion and arranged so as to be placed in tension when said portion is in said one extreme position, said weight member being of sufficient mass to pull said portion past said dead-center position responsive to an impact on said support, whereby to disengage said bridging member from said contacts, said toggle means comprising a hollow first link arm pivoted to one side of the support, a second link arm pivoted to the opposite side of the support, a plunger pivoted to the inner end of said second link arm and slidably engaging in said first link arm, and spring means in said first link arm urging said plunger outwardly.

5. In an impact-responsive safety switch, a support, a pair of spaced contacts on said support, snap-acting toggle means mounted on said support and having a portion movable toward and away from said contacts between two extreme positions spaced on opposite sides of a dead-center position responsive to toggle action thereof, a conductive bridging member carried by said toggle means adjacent said portion in a position to conductively engage said spaced contacts when said portion is in one extreme position nearest said contacts, an apertured plate element rigidly secured on said support, a weight member, flexible cable means extending through the aperture of said plate element and connecting said weight member to said portion and arranged so as to be placed in tension when said portion is in said one extreme position, said weight member being of sufficient mass to pull said portion past said dead-center position responsive to an impact on said support, whereby to disengage said bridging member from said contacts, said toggle means comprising a hollow first link arm pivoted to one side of the support, a second link arm pivoted to the opposite side of the support, a plunger pivoted to the inner end of said second link arm and slidably engaging in said first link arm, and spring means in said first link arm urging said plunger outwardly, and a reset arm rigidly secured to the inner end of said first link arm and having a laterally offset operating portion located externally of the support.

6. In an impact-responsive safety switch, a support, a pair of spaced contacts on said support, snap-acting toggle means mounted on said support and having a portion movable toward and away from said contacts between two extreme positions spaced on opposite sides of a dead-center position responsive to toggle action thereof, a conductive bridging member carried by said toggle means adjacent said portion in a position to conductively engage said spaced contacts when said portion is in one extreme position nearest said contacts, an apertured plate element rigidly secured on said support, a weight member, and flexible cable means extending through the aperture of said plate element and connecting said weight member to said portion and arranged so as to be placed in tension when said portion is in said one extreme position, said weight member being of sufficient mass to pull said portion past said dead-center position responsive to an impact on said support, whereby to disengage said bridging member from said contacts, said toggle means comprising an arm having a longitudinal bore, means pivotally connecting said arm to one side of the support, a plunger slidably received in said bore and having an enlarged external head, link means connecting said head to the opposite side of the support, and spring means in the bore urging said plunger outwardly.

References Cited by the Examiner

UNITED STATES PATENTS

| | | | |
|---|---|---|---|
| 2,206,067 | 7/1940 | Waltamath | 200—61.45 |
| 2,253,957 | 8/1941 | Kammerdiner | 200—61.52 |

BERNARD A. GILHEANY, *Primary Examiner.*

J. J. BAKER, *Assistant Examiner.*